United States Patent
Harvey (10) Patent No.: US 8,065,338 B2
(45) Date of Patent: Nov. 22, 2011

(54) DIRECTORY SEARCHING METHODS AND SYSTEMS

(75) Inventor: Richard Hans Harvey, Ringwood (AU)

(73) Assignee: Computer Associates Think, Inc., Islandia, NY (US)

( * ) Notice: Subject to any disclaimer, the term of this patent is extended or adjusted under 35 U.S.C. 154(b) by 487 days.

(21) Appl. No.: 09/827,738

(22) Filed: Apr. 6, 2001

(65) Prior Publication Data

US 2001/0037339 A1    Nov. 1, 2001

Related U.S. Application Data

(60) Continuation-in-part of application No. 09/427,267, filed on Oct. 26, 1999, now abandoned, which is a division of application No. 08/793,575, filed as application No. PCT/AU95/00560 on Aug. 30, 1995, now Pat. No. 6,052,681.

(30) Foreign Application Priority Data

Apr. 7, 2000 (AU) ........................................ PQ6785

(51) Int. Cl.
*G06F 7/00* (2006.01)
*G06F 17/30* (2006.01)

(52) U.S. Cl. ........................................ 707/802; 707/810

(58) Field of Classification Search ........ 707/100–104.1, 707/3, 1–10, 200–206
See application file for complete search history.

(56) References Cited

U.S. PATENT DOCUMENTS

| | | | |
|---|---|---|---|
| 5,117,349 A | 5/1992 | Tirfing et al. | 707/3 |
| 5,291,583 A | 3/1994 | Bapat | 717/137 |
| 5,333,317 A * | 7/1994 | Dann | 707/5 |
| 5,388,255 A | 2/1995 | Pytlik et al. | 707/4 |
| 5,412,804 A | 5/1995 | Krishna | 707/2 |
| 5,414,812 A | 5/1995 | Filip et al. | 707/103 R |
| 5,442,690 A | 8/1995 | Nazif et al. | 379/207 |
| 5,491,817 A | 2/1996 | Gopal et al. | 395/600 |
| 5,530,853 A | 6/1996 | Schell et al. | 707/1 |
| 5,548,726 A | 8/1996 | Pettus | 707/221 |
| 5,634,053 A | 5/1997 | Noble et al. | 707/4 |
| 5,649,182 A | 7/1997 | Reitz | 707/7 |
| 5,664,172 A | 9/1997 | Antoshenkov | 395/604 |
| 5,692,181 A | 11/1997 | Anand et al. | 707/102 |
| 5,794,232 A | 8/1998 | Mahlum et al. | 707/3 |
| 5,806,061 A | 9/1998 | Chaudhuri et al. | 707/3 |

(Continued)

FOREIGN PATENT DOCUMENTS

EP    0 689 148 A1    5/1995

(Continued)

OTHER PUBLICATIONS

C.M.R.Leung, GDSA: An X.500 Directory Implementation Supporting Heterogeneous Databases, Apr. 1991, IREE, 85-90 and 1/6/6.*

(Continued)

*Primary Examiner* — Jean B Fleurantin (74) *Attorney, Agent, or Firm* — Baker Botts L.L.P.

(57) ABSTRACT

Methods for arranging data in relational databases and for searching directory service databases and systems are provided. In particular, but not exclusively, systems and directories which implement or perform X.500 or LDAP services in a relational database are provided. The present application includes a database arrangement that stores data types in a table as components and searches the components for desired data entries.

14 Claims, 5 Drawing Sheets

U.S. PATENT DOCUMENTS

| | | | |
|---|---|---|---|
| 5,864,840 A | 1/1999 | Leung et al. | 707/2 |
| 5,878,415 A | 3/1999 | Olds | 707/9 |
| 5,953,716 A | 9/1999 | Madnick et al. | 707/4 |
| 5,970,497 A | 10/1999 | Burrows | 707/102 |
| 5,987,446 A | 11/1999 | Corey et al. | 707/3 |
| 6,003,022 A | 12/1999 | Eberhard et al. | 707/2 |
| 6,003,050 A | 12/1999 | Silver et al. | 715/536 |
| 6,009,422 A | 12/1999 | Ciccarelli | 707/4 |
| 6,016,497 A | 1/2000 | Suver | 707/103 R |
| 6,016,499 A | 1/2000 | Ferguson | 707/104.1 |
| 6,044,442 A | 3/2000 | Jesionowski | 711/153 |
| 6,052,681 A | 4/2000 | Harvey | 707/3 |
| 6,085,188 A | 7/2000 | Bachmann et al. | 707/3 |
| 6,112,198 A | 8/2000 | Lohman et al. | 707/3 |
| 6,112,304 A | 8/2000 | Clawson | 713/156 |
| 6,115,703 A | 9/2000 | Bireley et al. | 707/2 |
| 6,119,129 A | 9/2000 | Traversat et al. | 707/202 |
| 6,122,627 A | 9/2000 | Carey et al. | 707/4 |
| 6,182,153 B1 | 1/2001 | Hollberg et al. | 719/315 |
| 6,192,405 B1 | 2/2001 | Bunnell | 709/225 |
| 6,195,653 B1 | 2/2001 | Bleizeffer et al. | 707/2 |
| 6,199,062 B1 | 3/2001 | Byrne et al. | 707/3 |
| 6,236,988 B1 | 5/2001 | Aldred | 707/3 |
| 6,236,997 B1 | 5/2001 | Bodamer et al. | 707/10 |
| 6,356,892 B1 | 3/2002 | Corn et al. | 707/3 |
| 6,370,522 B1 | 4/2002 | Agarwal et al. | 707/3 |
| 6,728,720 B1 | 4/2004 | Lenzie | 707/101 |
| 6,732,360 B1 | 5/2004 | Seo et al. | 719/310 |
| 6,879,990 B1 | 4/2005 | Boyer et al. | 707/205 |
| 2002/0059199 A1 | 5/2002 | Harvey | 707/3 |
| 2003/0105749 A1 | 6/2003 | Harvey | 707/3 |
| 2003/0191759 A1 | 10/2003 | Harvey | 707/4 |
| 2003/0208478 A1 | 11/2003 | Harvey | 707/3 |
| 2006/0020613 A1 | 1/2006 | Harvey | 707/100 |

FOREIGN PATENT DOCUMENTS

| | | |
|---|---|---|
| GB | 2 329 044 A | 3/1999 |
| WO | 9607147 | 3/1996 |
| WO | 9634350 | 10/1996 |

OTHER PUBLICATIONS

C.M.R. Leung, An Object-Oriented Approach to Directory Systems, Sep. 24-27, 1990, IEEE, 736-740.*

Paul Barker, An Analysis of User Input to an X.500 White Page Directory Service, 1995, IEEE, 112-125.*

C.M.R. Leung, An object-oriented approach to directory systems, 1999, IEEE, vol. 2, 736-740.*

Hong et al., Design and Implementation of a Distributed Applications Tested, 1993, IEEE, 170-174.*

M.A. Bauer et al., A simulation Model for X.500 Directories Initial Experiences, 1991, IBM Canada Laboratory Technical Report TR-74.075, 255-276.*

Joann J. Ordille et al., Nomenclator Descriptive Query Optimization for Large X.500 Environments, 1999, ACM, 185-196.*

J. Rumbaugh et al., Object-Oriented Modeling and Design, 1991, ISBN 0-13-6300545, 366-396.*

Watanabe K., et al. Eliminate Information Inconsistency for X.500 Directory; NTT Inf. & Commun. Sys. Labs., pp. 1180-1184.

Molesworth R., "An Overview of the CCITT X.500 Directory System" Second IEE National Conference on Telecommunications, No. 1989, Apr. 2, 1989, pp. 179-183.

Hung, R. "CCITT X.500 Directories—Principles and Applications" Computer Communications, vol. 15, No. 10, Dec. 1, 1992, pp. 636-645.

Ordille J J et al., "Nomenclator Descriptive Query Optimization for Large X.500 Environments" Computer Communications Review, vol. 21, No. 4, Sep. 1, 1991, pp. 185-196.

Bohdan Smetaniuk: "Distributed Operation of the X.500 Directory" Computer Networks and ISDN Systems, vol. 21, No. 1, Mar. 1, 1991, pp. 17-40.

The Proceedings of IFIP WG6.6 International Symposium (ISBN: 0444 889 167) Francois Peruchond, Cumo Lanz & Bernard Plattner, "A Relational Data Base Design for an X.500 Directory System Agent" pp. 405-418.

"object-Oriented Modeling and Design" by J. Rumbaugh, et al., 1991, ISBN 0-13-630054-5, pp. 366-396.

CCITT, vol. VIII, Data Communication Networks Directory Recommendations X.500-X521 ISBN 92-61-03731-3.

"Database Design and Management", David Stampler and Wilson Price, 1990 ISBN 0-07-100934-5, pp. 295-323.

Cooke B E et al., "Directory Services in the HP Map 3.0 Environment" Hewlett-Packard Journal, vol. 41, No. 4, Aug. 1, 1990, pp. 15-23.

Heywood P. et al., "A Big Step Toward a Global Directory", Data Communications, vol. 23, No. 1, Jan. 1, 1994, pp. 99-100.

The Proceedings of IREE, ACTS; C.M.R. Leung; GDSA: An X.500 Directory Implementation Supporting Heterogeneous Databases, Apr. 1991, pp. 85-90.

Jarke, Mathias et, al., Query Optimization in Database Systems, Computing Surveys, vol. 16, No. 2, pp. 111-152, Jun. 1984.

Recommendation X.500, The Directory—Overview of Concepts, Models and Services, Melbourne, Fascicle VIII. 8—Rec. X.500, pp. 3-19, 1988.

Leung, C.M.R., An Object-Oriented Approach to Directory Systems, IEEE Region 10 Conference on Computer and Communications Systems, Hong Kong, pp. 736-740, Sep. 1990.

Grumbach, Stephane, et al., Towards Tractable Algebras for Bags, Journal of Computer and System Sciences, ACM Princ. of Database Systems, pp. 1-34, 1993.

Written Opinion for International Application No. PCT/AU95/00560, 5 pages, May 27, 1996.

Written Opinion for International Application No. PCT/AU95/00560, 7 pages, Aug. 5, 1996.

Written Opinion for International Application No. PCT/AU95/00560, 7 pages, Sep. 19, 1996.

Notification of Transmittal of International Preliminary Examination Report for International Application No. PCT/AU95/00560, 14 pages, Dec. 23, 1996.

European Patent Office, Communication for Application No. 95930331.4, 3 pages, Apr. 2, 1998.

Patent Pending U.S. Appl. No. 09/427,263 entitled Directory Service System and Method with Tolerance for Data Entry Storage and Input, by Richard H. Harvey, 92 pages specification plus 6 pages of drawings, Oct. 26, 1999.

Patent Pending U.S. Appl. No. 09/721,806 entitled A Method and Apparatus for Operating a Database by Richard H. Harvey, 14 pages specification plus 5 pages of drawings, Nov. 24, 2000.

European Patent Office, Communication pursuant to Article 96(2) EPC for Application No. 95 930 331.4-2212, 1 page, Dec. 4, 2001.

Bachmann et al.; "Implement LDAP Search Queries with SQL," ip.com PriorArtDatabase, 7 pages, Dec. 1, 1998.

Oracle8i, "Designing and Tuning for Performance," XP-002229598, 94 pages, Dec. 1999.

Communication Pursuant to Article 96(2) EPC, Application No. 01 930 950.9-1225, 7 pages, Apr. 12, 2006.

Shi et al., "An enterprise directory solution with DB2," IBM Systems Journal, vol. 39, No. 2, pp. 360-383, 2000.

European Patent Office Examination Report for Application No. 00 980 695.1; 5 pages, Apr. 8, 2003.

European Patent Office Examination Report for Application No. 00 980 695.1-2201; 5 pages, Mar. 4, 2007.

Kills, "Mapping the Global Naming Tree Onto a Relational Database," Department of Computer Science, pp. 105-114, 1986.

Communication pursuant to Article 96(2) EPC, Application No. 03 002 798.1-1225, 6 pages, Nov. 7, 2007.

Communication pursuant to 94(3) EPC, Application No. 03 002 798.1-1225; Ref. No. HD/KT/J43358EPA, 8 pages.

* cited by examiner

DIRECTORY SEARCHING METHODS AND SYSTEMS

CROSS-REFERENCE TO RELATED APPLICATIONS

The present application is a continuation-in-part of U.S. Ser. No. 09/427,267 filed Oct. 26, 1999 now abandoned, which is a divisional of U.S. Ser. No. 08/793,575 filed May 22, 1997 (now U.S. Pat. No. 6,052,681), which is a National Stage of International Application No. PCT/AU95/00560 filed Aug. 30, 1995, each of which are incorporated herein in their entirety by reference.

BACKGROUND

1. Field

The present application relates to the field of directory services. More particularly, the present application relates to the application of electronic directory services, e.g., X.500 or LDAP, in relational databases, to table structures in database arrangements used for searching, and to methods for searching databases.

2. Description of the Related Art

A Relational Database Management System (RDBMS) provides facilities for applications to store and manipulate data. Amongst the many features that an RBDMS offers are data integrity, consistency, concurrency, indexing mechanisms, query optimisation, recovery, roll-back, security. RBDMS also provide many tools for performance tuning, import/export, backup, auditing and application development.

RDBMS are the preferred choice of most large scale managers of data. RDBMS are readily available and known to be reliable and contain many useful management tools. There is a large base of RDBMS installations and therefore a large amount of existing expertise and investment in people and procedures to run these systems, and so data managers are looking to use this when acquiring new systems. Most relational database products support the industry standard SQL (Structured Query Language).

There has also been a move towards Object Oriented systems, which provide data extensibility and the ability to handle arbitrarily complex data items. In addition, many corporations and governmental departments have a large number of database applications, which are not interconnected. Data managers are looking for solutions which enable them to integrate their data, and to simplify the management of that data. Electronic directories provide data managers with a tool to achieve these objectives. Some electronic directories are standardized. X.500 is the International Standard for Electronic Directories [CCITT89 or ITU93]. These standards define the services, protocols and information model of a very flexible and general purpose directory. X.500 is applicable to information systems where the data is fairly static (e.g. telephone directory) but may need to be distributed (e.g. across organisations or countries), extensible (e.g. store names, addresses, job titles, devices etc.), object oriented (i.e. to enforce rules on the data) and/or accessed remotely. Electronic directories, such as X.500 and its associated standards, provide a framework and a degree of functionality that enables data managers to achieve their objectives.

Typically, data managers prefer to implement an electronic directory, e.g., an X.500 directory, with all the flexibility of object-oriented systems, but using an SQL product so that the system can achieve the scalability and performance inherent in relational systems coupled with the stability, robustness, portability and cost-effectiveness of current SQL products.

One example of an electronic directory implementation is described in U.S. Ser. No. 09/427,267 and its corresponding Australian Patent 712451 both of which are incorporated herein in their entirety by reference. In the search strategies for this implementation, at a conceptual level, hierarchy tables, e.g., NAME, DIT and TREE, are used to maintain relationships between objects in a hierarchy. These hierarchy tables are arranged according to one row per object. Object tables, e.g., SEARCH and ENTRY, manage values within an object. These object tables are arranged according to one row per value. Every object has a corresponding row in the hierarchy tables and every attribute value has a corresponding row in the object tables. In this implementation, the object table used for searching objects contains rows of the form (EID, AID, VID, Norm), where EID identifies the object to which the value belongs, AID identifies the attribute type of the value, VID identifies one of a possible number of attribute values in the one entry, and Norm contains the syntax normalized value. Attribute tables, e.g., attribute, define information about attribute types. The attribute table used contains rows of the form (AID, SYX, DESC, OBJECT ID).

It has been discovered that improvements to electronic directory implementations may be achieved for arranging and searching databases for complex data types.

SUMMARY

The present application relates to the storing and/or searching for data types using some form of indicia, such as one of the components contained in stored data, an identifier of stored data and/or a manipulation of stored data. This implementation facilitates the searching of complex data types by adding new search and/or attribute tables that store information relating to data entries, predetermined information considered to be of assistance or useful in searching for particular entries of a database, such as, by not limited to including component identifier (CID) information representing an individual component and/or component value identifier information (CVID) representing a multi-valued component or components used for searching. These new tables are referred to herein as subsearch tables and/or subattribute tables which serve to store components of values, and facilitate the searching of individual components and/or multi-valued components. However, such tables can be referenced with any name.

In one embodiment, the present application provides a method of arranging data in a database. The method includes creating a first table adapted for storing the data and having one row for each data entry, and creating a second table adapted for storing data components and having one row for each component of the stored data type. Preferably, the data is a structured data type or a string data.

The present application also provides a database and/or directory having a data storage arrangement. Throughout the remainder of the specification, reference is made to a database, however this equally applies to a directory services system. The data storage arrangement includes a first table directed to a hierarchy which defines a relationship between objects and configured to have one row per object, a second table directed to objects which define one or more values within each object and configured to have one row per value, and a third table directed to one or more selected components or representations of values and configured to have one row for each component of each value. Preferably, the database is a part of a directory services system, such as X.500 or LDAP services system.

The present application also provides a method of searching a database for a given data entry. In this embodiment, the database has a first table adapted for storing data and having one row for each data entry, and a second table adapted for storing data components or representations and having one row for each component of the stored data. The searching method includes determining a component or representation of a given data entry, executing one of an exact or initial matching on the second table in order to locate the component or representation, and returning the given data entry matching the component or representation located.

Throughout the specification, reference to 'component' may instead or in addition include 'representations' of values, e.g. reverse indexing or pointers or fingerprints or checksum, or some suitable smaller representation of relatively large data.

BRIEF DESCRIPTION OF THE DRAWINGS

Preferred embodiments of the present application will now be described with reference to the accompanying drawings, in which.

DETAILED DESCRIPTION

Figure 1A:
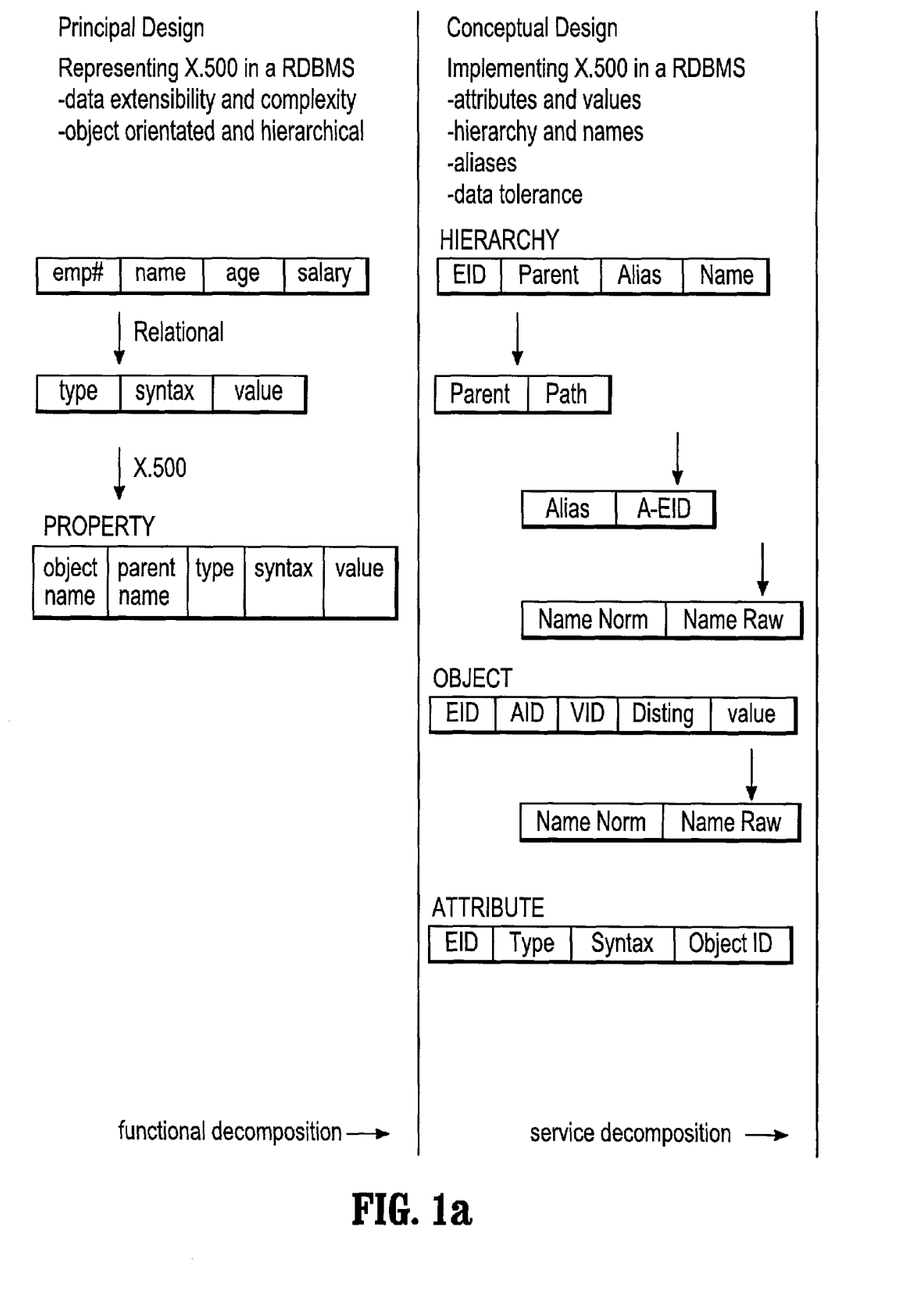
FIG. 1a illustrates a principle and conceptual design of an exemplary database according to the present application.
Figure 1B:
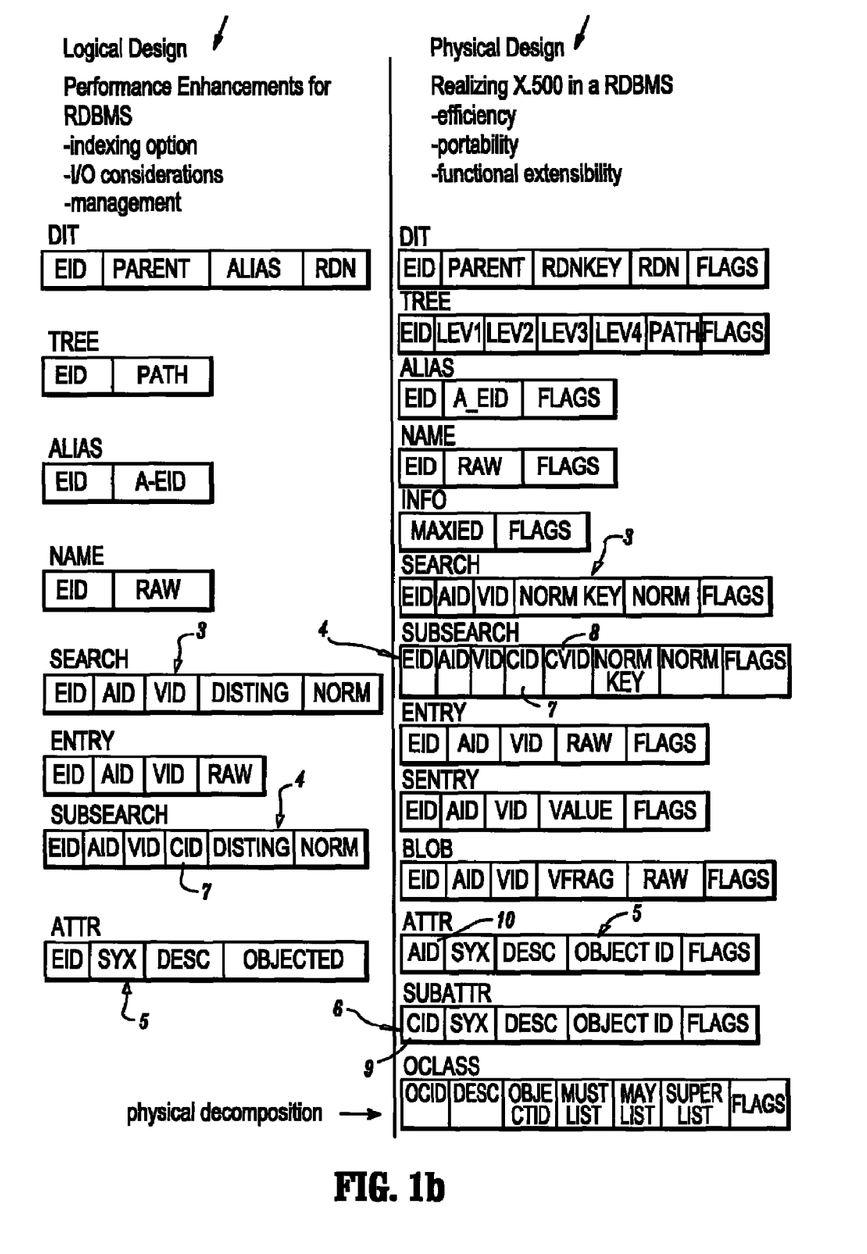
FIG. 1b illustrates a logical and physical design of an exemplary database according to the present application including a subsearch table and a subattribute table.

FIG. 1a illustrates an exemplary implementation of a database design and is only one type of database to which the methods and arrangements of the present application can be applied. A more detailed description of this database design can be found in U.S. Ser. No. 09/427,267 which is incorporated herein in its entirety by reference. FIG. 1b illustrates a more detailed implementation of the database design of FIG. 1a. Generally, when searching a directory having a database, a search argument defines where to start the search (base object), the scope of the search (subset), the conditions to apply to the search (filter) and what information should be returned from the search (selection). The filter is a combination of one or more filter items (or conditions) connected by operators such as AND, OR and NOT.

For general search services filters are applied to values and attributes in the object table, e.g., the search table. An example of a general filter is "NORM LIKE '%RICK HARVEY%'". For particular search services (described in more detail below) a clause may be added the SQL statement that includes a component identifier, which addresses a particular component of a data type and an exact or initial (or "begins with") filter is applied to components in a subsearch table instead of the search table. An example of such a clause is "AND CID=n", and an example of an exact filter is "NORM='RICK HARVEY'".

Referring to FIG. 1b, the table structure of logical design 1 and physical design 2 include search table 3, subsearch table 4, attribute table 5, and subattribute table 6. The search table 3 and attribute table 5 are similar to the search and attribute tables described in U.S. Ser. No. 09/427,267 and will not be described in more detail here. The subsearch table 4 can be configured to include one or more components used to improve the speed and reliability of the search. For example, the subsearch table 4 can include a CID field 7 and a CVID field 8. The CID field 4 serves as a tool (or index) for searching components of data types, and the CVID field 8 serves as a tool (or index) for multi-valued component searching. Although the method according to the present application can be used with one or more of the above-identified tables, preferably, each table is provided so that there is a choice for particular search queries.

The attribute table 5 describes or references information in search table 3, and the subattribute table 6 describes or references information in subsearch table 4. The subattribute table 6 has similar fields as the attribute table 5, but substitutes CID field 9 for AID field 10. The CID field 9 is used to identify one or more components in the subsearch table 4.

The subsearch table 4 preferably stores information that improves searching performance or components of complex data types. Other components stored in the subsearch table can be those that improve the manageability of the database. In other words, it is not a requirement that every value in a data entry is included in the subsearch table.

Figure 2:
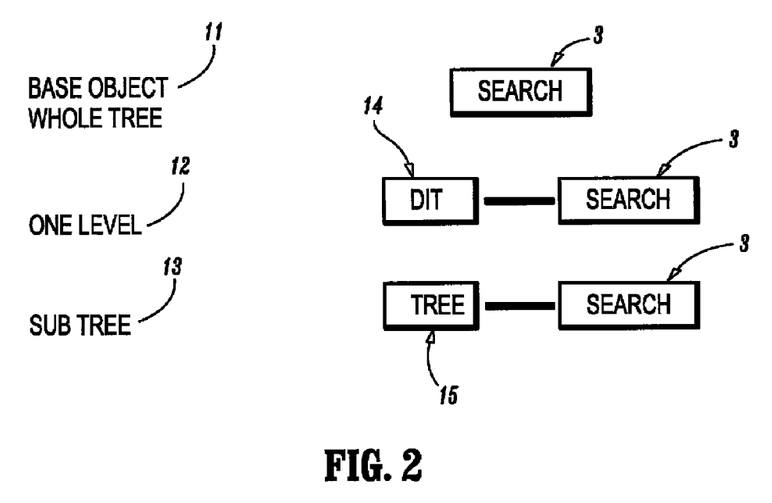
FIG. 2 is a schematic representation of a high order search method according to the present application.
Figure 3:
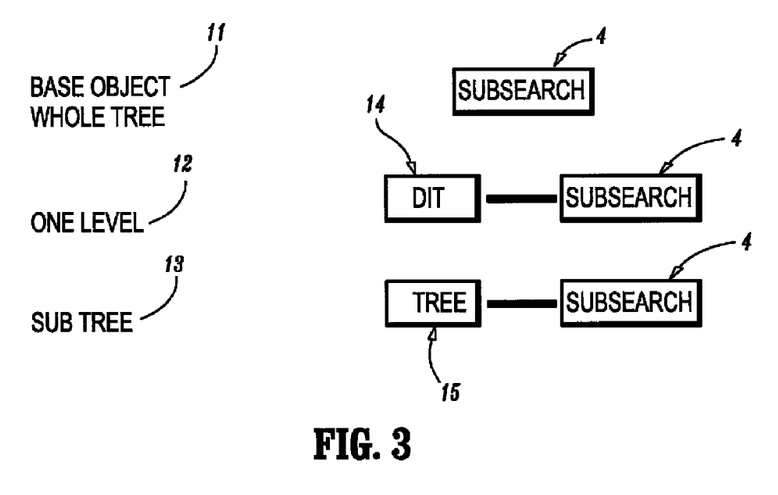
FIG. 3 is a schematic representation of a sub-order search method according to the present application.

Referring to FIGS. 2 and 3, methods for searching a database will be described. Examples of searches include base object and whole tree searches 11, one level search 12 and subtree search 13. More detail descriptions of these searches can be found in U.S. Ser. No. 09/427,267. Searches that have a scope of base object or whole tree 11 use the search table 3. Searches that have a scope of base object or whole tree 11 and can make use of a stored component use the subsearch table 4. Searches that have a scope of one level 12 use a join between the DIT table 14 and search table 3. Searches that have a scope of one level 12 and can make use of a stored component use a join between the DIT table 14 and subsearch table 4. Searches that have a scope of subtree 13 use a join between the tree table 15 and search table 3. Searches that have a scope of subtree 13 and make use of a stored component use a join between the tree table 15 and subsearch table 4.

To illustrate, if a desired search argument is structured with a general filter, the base object and whole tree searches 11 would use the search table 3, the one level search 12 would use DIT table 14 and search table 3, and the subtree search 13 would use tree table 15 and search table 3. An example of an SQL statement for such a search may be:

SELECT EID{other columns} FROM SEARCH {other tables} WHERE {filter}

However, in such a search, if the filter applied were, for example, to a highly repetitive data string, a portion of a data string or a component of a structured data type, the search may be slow and inefficient because the database may have to scan through a large number of values.

One way to improve the efficiency of such a search is to utilize a subsearch table and search one or more components associated with the stored data. In such instances the database may be able to use an index to the component in the string or structure thus avoiding a scan of a large number of values. An example of an SQL statement for such a search would be:

SELECT EID {other columns} FROM SUBSEARCH {other tables} WHERE {filter} AND CID=x In this implementation, the base object and whole tree searches 11 would use the subsearch table 4, the one level search 12 would use DIT table 14 and subsearch table 4, and the subtree search 13 would use tree table 15 and subsearch table 43. In this example, the filter used would reference a component of the data stored, which permits the use of an index and results in faster more efficient searches. The index used in this example includes CID=x.

Structured Attributes

Methods according to the present application can be used in various other applications. One application is the security area where directories are increasingly being used by Certification Authorities to store standardized certificates. An example of such a certificate is an X.509 certificate. Certificates such as the X.509 can be referred to as 'complex' attributes because they contain many components. However, the present application should not be limited to only these types of certificates. It will be understood that the present application can be utilized with any form of information having components.

When storing such certificates consideration should be given as to how the certificate is stored so that retrieval of a certificate is quick and reliable (i.e., the desired certificate is actually retrieved). The methods and database arrangements of the present application achieve this by finding and managing one or more of the components of the data in the certificate, e.g., serial number, expiration date and issuer.

Figure 4:
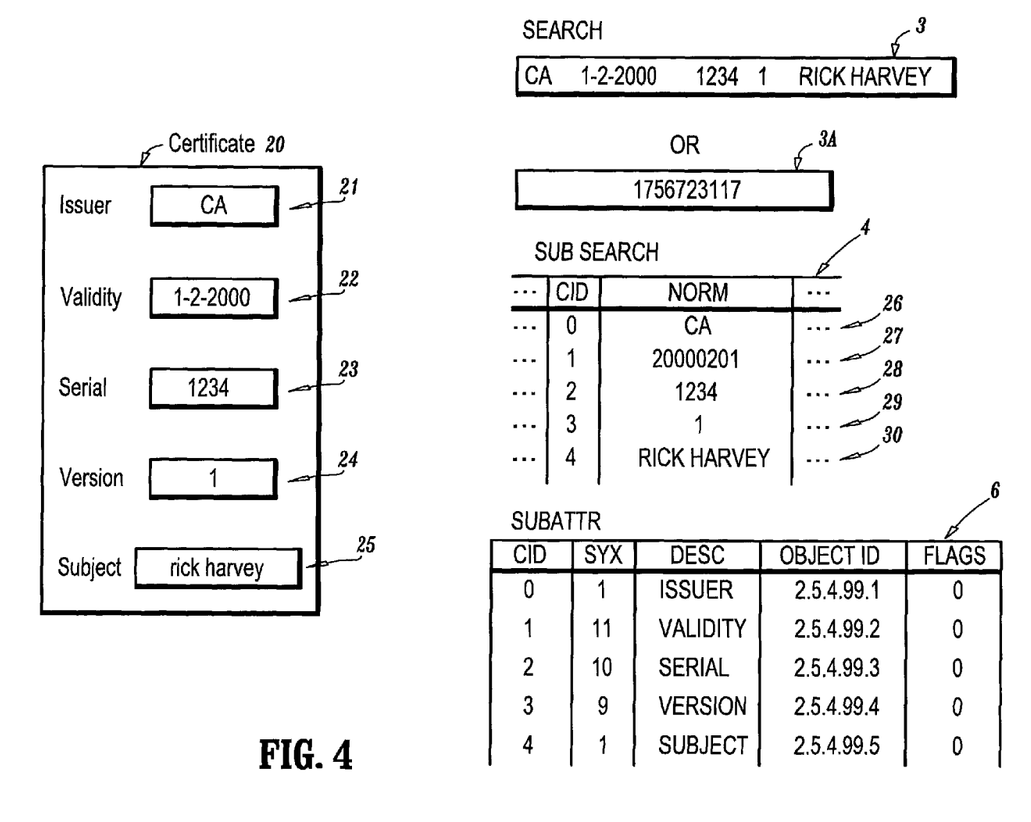
FIG. 4 illustrates an exemplary X.509 certificate and corresponding example of search and subsearch tables.

FIG. 4 illustrates the application of the present application to X.509 certificates. For the purposes of clarity only a small part of each table is illustrated. The certificate 20 is illustrated schematically, and for the purposes of illustration only shows information, such as the issuer at field 21, validity information at field 22, serial number at field 23, version number at field 24, and subject information (e.g., rick harvey) at field 25. For this example, the search table 3 is arranged in one row with spaces (preferably two) separating the normalized value of each component or field of the certificate 20. The search table also includes a normalized value representing the entire certificate. The subsearch table 4 is arranged with one or more rows (26, 27, 28, 29 and 30) where one row corresponds to one component or field in certificate 20. It should be noted however that the subsearch table 4 does not have to include every field identified in certificate 20.

To illustrate an implementation for this embodiment, assume that a simple certificate consists of information similar to what a credit card holds, e.g., a serial number, an expiration date, and the cardholders name. This simple certificate has three components or fields, namely a number field, a date field and a string field. In this simplified example, the normalized value of certificate 20 that would be stored in the search table 3 (of the form in FIG. 1b) is as follows:

(xx, yy, zz, "123456  20000806123000  RICK HARVEY)"
and the subsearch table 4 may store, for example, three rows—one for each component of the certificate. Each row of the subsearch table would be in the form of FIG. 1b:

(xx, yy, zz, 0, 0, "123456")
(xx, yy, zz, 1, 0, "20000806123000")
(xx, yy, zz, 2, 0, "RICK HARVEY")

where xx, yy and zz are integers corresponding to fields in the particular table design, such as EID, AID and VID.

A search for a certificate that was issued to "RICK HARVEY" that utilized the search table 3 may use the following SQL statement:

SELECT . . . FROM . . . SEARCH . . . WHERE AID=27 and NORM LIKE '%RICK HARVEY%' where the general filter is "NORM LIKE '%RICK HARVEY%'". However, using search table 3 for such a search may be slow because each component of the string for each entry would have to be examined and the degree of certainty that the string being searched and retrieved is the desired entry. This is because the flattened representation has no boundaries as it is an unstructured text representation.

A search for a certificate that was issued to "RICK HARVEY" would be more efficient if subsearch table 4 were utilized when applying an exact or initial filter and a component identifier were added to the search argument. In this instance, the following SQL statement may be used:

SELECT . . . FROM . . . SUBSEARCH . . . WHERE . . . AID=27 AND CID=4 AND NORM='RICK HARVEY'

Where "NORM='RICK HARVEY'" is the filter, AID=27 is the attribute identifier for a certificate and CID=4 is the component identifier for the subject.

In the above example, a search with the component identifier (or index) CID=4 is used because it is known from the design of subsearch table 4 or from subattribute table 6, that index CID=4 is a string representing cardholders name. A query where the index CID is set to 4, and the filter is "NORM='RICK HARVEY'" should return Rick Harvey's certificate. This query is considered to be better because it can make use of an appropriate index making the search faster and increasing the degree of certainty that the search will find the correct certificate or certificates. It should be noted that the actual designation of characters/letter or numerals in the subsearch table design is arbitrary, and may be designed in whatever manner to suit the particular application.

Referring again to FIG. 4, an alternative implementation of a method according to the present application will be described. In this implementation, search table 3A is a search table arranged to include a check sum or finger print. Because the search table 3A is used for exact matching on some attribute types e.g. binary, the value in the search table may be a fingerprint or checksum value. This makes the storage in the search table more efficient, as there is less data required to be stored.

String Attributes

The present application can also be utilized for non-complex data types, such as string data types. Examples of string data types include multi-word sentences, multi-line paragraphs of text, and a multi-line postal addresses. In this case, an attribute value that is a simple sentence may be stored in a single row in the search table as:

(1122, 33, 0, "MANY WORD SENTENCE")

where columns (or fields) are defined as (EID, AID, VID, NORM). A query searching the string data type for 'WORD' would involve looking at the rows for the part-word "%WORD%, which is considered a relatively slow search. To improve searching of such data the string is stored as components in the subsearch table 4 so that the string "MANY WORD SENTENCE" would be stored in three rows as follows:

(xx, yy, zz, 0, 0, "MANY")
(xx, yy, zz, 0, 1, "WORD")
(xx, yy, zz, 0, 2, "SENTENCE")

where the columns are defined as (EID, AID, VID, CID, CVID, NORM), respectively. In this example, the filter applied would then use the subsearch table 4 instead of the search table 3 and the following SQL statement could be used to search for "WORD":

SELECT . . . FROM SUBSEARCH . . . WHERE AID=33 AND CID=0 AND NORM="WORD"

The result would be a much faster search as we are looking for an exact match of "WORD" rather than, as above, looking for a part word "%WORD%".

Alternative Index

The present application also has general applicability to the problem of being able to add one or more indices to a given attribute for the purpose of increasing performance for certain types of queries. Adding indices provides a different path in order to find an attribute, such as for example, reverse indexing. In this case, there may only be one component in the subsearch table. The component in effect represents an alternate form of that attribute value.

In particular, the subsearch table can cope with the problem of "ends in" searches or searching for values where an initial portion of data stored is relatively highly repetitive (such as distinguished names, MAC addresses, telephone numbers, full qualified file names, etc) by storing a reversed form of the value and thereby giving effect to having a reversed index on the attribute. For example, referring to FIG. 5, a telephone number 31 is entered into a search table 32, and the telephone number is also entered into a subsearch table 33 in a reverse form. Of course this aspect of application is not limited to the reverse form, it may be any other suitable form of data entry suitable for a given situation or search, such as treating the area code of a telephone number as a separate component.

Figure 5:
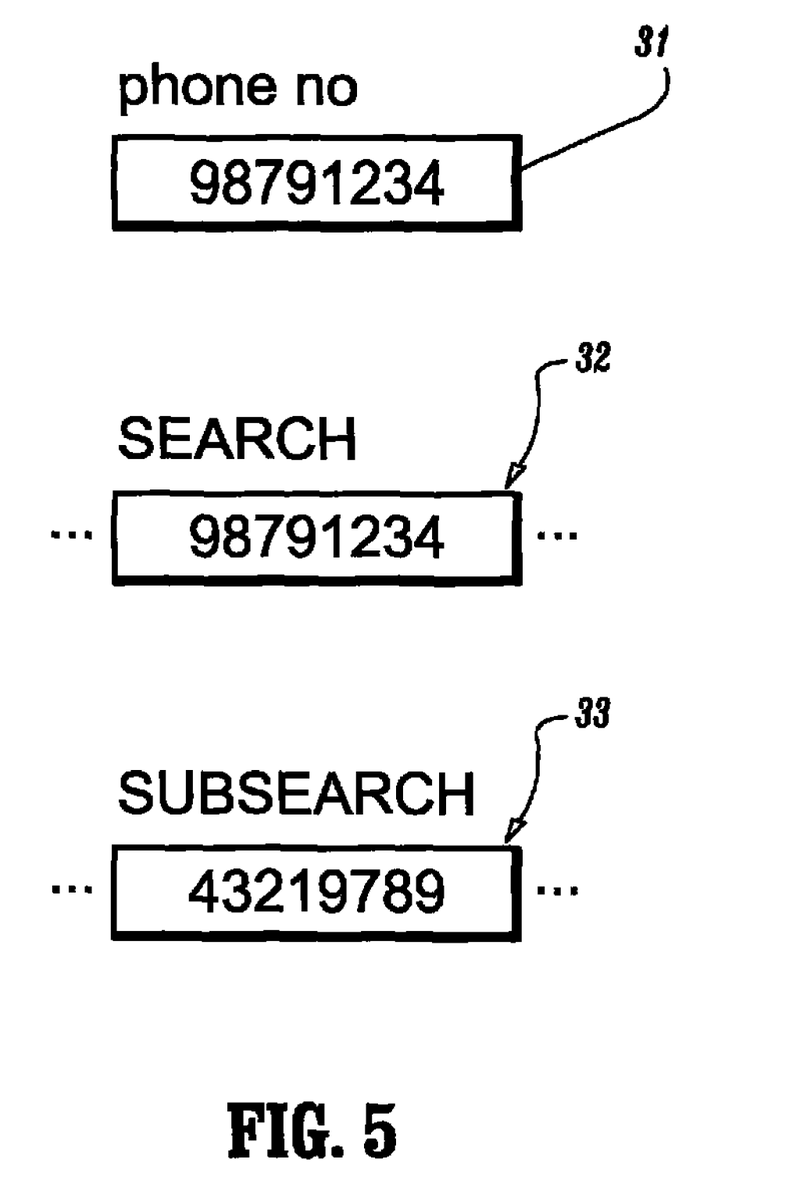
FIG. 5 illustrates exemplary search and subsearch tables related to a telephone number data component.

When searching for a telephone extension, which is typically the end portion of a telephone number, a search may be expressed as a string search for "*1234" (the star being a wild card). If only search table 32 were used, then the performance of the search would be slow because indexes are only possible for "begins with" or "exact" searches. However, with the attribute stored in the subsearch table 33 in reverse, the subsearch table could be used to do an equivalent search, e.g. "4321*" which is considered to be very fast.

More particularly, the search table 32 might store a telephone number for a given person as:
    (1122, 44, 0, "98791234")
and in the subsearch table 33 would be stored:
    (1122, 44, 0, 0, 0, "43219789")
and an SQL statement to find a telephone number that ends in "1234" could be of the form:
    SELECT . . . FROM SUBSEARCH . . . WHERE AID=44 and CID=0 and NORM LIKE '4321%'
Searching the subsearch table 33 should retrieve the desired record faster than searching the search table 32 because the search is for an initial match (i.e., begins with) for "4321", which is a faster search.

Another example of an alternative index is the storing of a checksum of a binary value, e.g., photograph or audio.

Still another example of an alternative index is the storing of a fingerprint being a smaller representation of the data, such as a smaller representation of a photograph.

Although the present application is disclosed with reference to an X.500 directory services system, the application should not be limited to the system and methods disclosed therein. As will be understood from a reading of the specification as a whole, the present application may be applied or implemented in a number of different directory services systems or use a variety of methods.

What is claimed is:

1. A method of arranging and searching for data in a database comprising:
    creating a first table storing data comprising at least one data entry, the data entry comprising a plurality of data components, the first table comprising one row for each data entry;
    creating a second table storing the plurality of data components of the data entry of the first table, the second table comprising one row for each of the plurality of data components of the data entry of the first table; and
    searching the rows of the second table to identify a particular one of the plurality of data components; and
    returning the given data entry from the first table that includes the particular one of the plurality of data components.

2. The method as claimed in claim 1, wherein the data is a structured data type.

3. The method as claimed in claim 1, wherein the data is a string data type.

4. The method as claimed in claim 1, wherein the data is or represents a X.509 certificate.

5. The method as claimed in claim 1, wherein a selected one of the data components is a checksum or fingerprint.

6. The method as claimed in claim 1, where the database is a part of an electronic directory services system.

7. The method as claimed in claim 6, where the electronic directory services system comprises an X.500 and LDAP services system.

8. A method of searching a database for given data entries, comprising:
    determining a component of a given data entry of a first table, the given data entry of the first table comprising a plurality of data components;
    identifying a component identifier indicating a data type that is associated with the component of the first table;
    using the component identifier indicating the data type to execute one of an exact or initial matching on a column of a second table in order to locate the component in the second table, the second table comprising one row for each of the plurality of data components of the given data entry of the first table; and
    returning the given data entry from the first table matching the component located.

9. The method as claimed in claim 8, where the database is a part of an electronic directory services system.

10. The method as claimed in claim 9, wherein the component is a checksum or fingerprint of the data.

11. The method as claimed in claim 10, wherein the search is conducted using a search table to locate the fingerprint or checksum.

12. A method as claimed in claim 11, further wherein components of the checksum or fingerprint are searched.

13. The method as claimed in claim 8, where the electronic directory services system comprises an X.500 and LDAP services system.

14. The method as claimed in claim 8, wherein the data is or represents one or more of the following: a X.509 certificate, a check sum of the data, and a fingerprint of the data.

* * * * *